Figure 1:
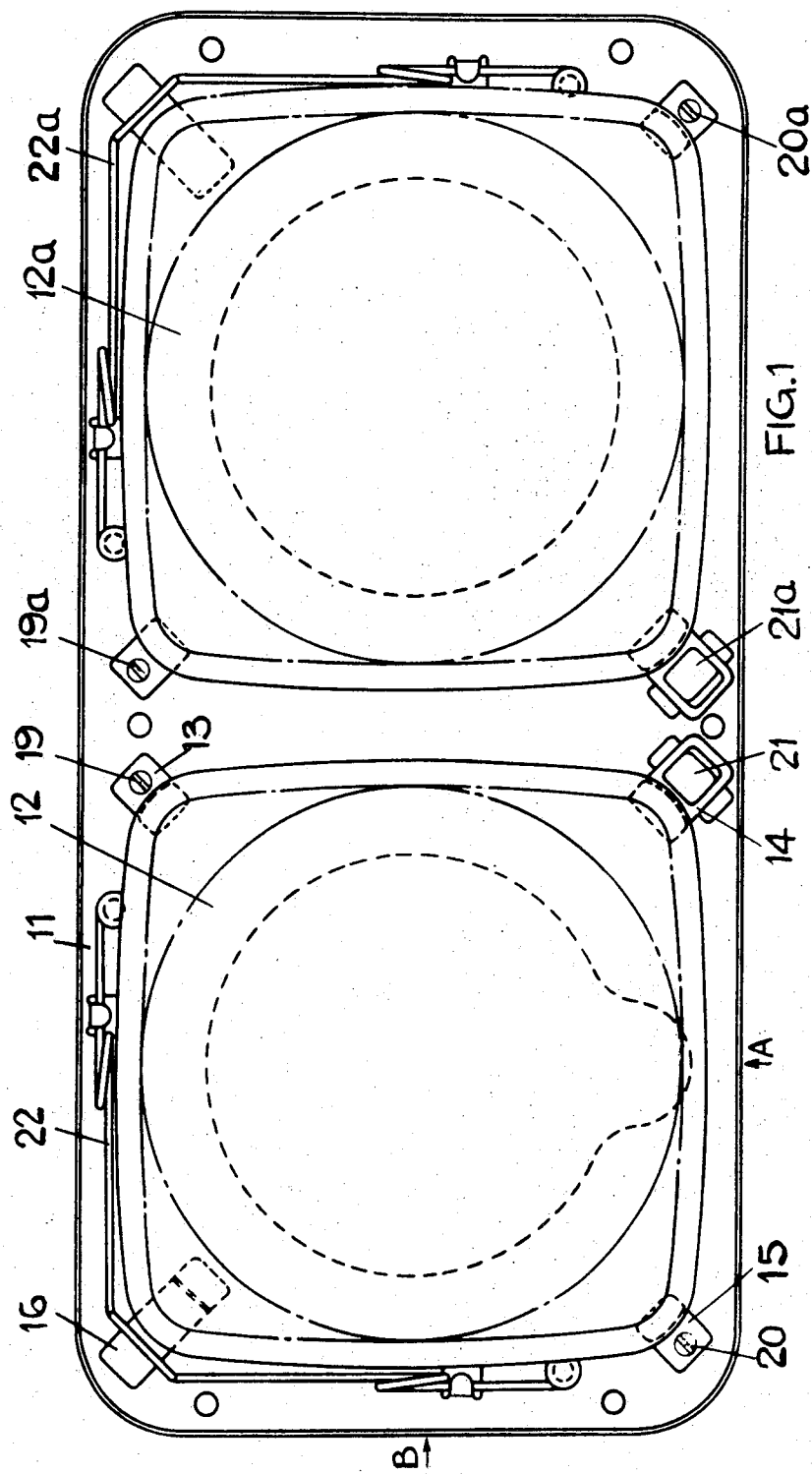

United States Patent [19]
Bright et al.

[11] 3,710,097
[45] Jan. 9, 1973

[54] HEADLAMP ASSEMBLIES

[75] Inventors: Peter Frederick Bright, Moseley; Michael John Germany, Lichfield, both of England

[73] Assignee: Joseph Lucas (Industries) Limited, Birmingham, England

[22] Filed: Jan. 15, 1971

[21] Appl. No.: 106,857

[30] Foreign Application Priority Data

Jan. 23, 1970 Great Britain.....................3,297/70
Sept. 18, 1970 Great Britain....................44,603/70

[52] U.S. Cl.............................240/41.6, 240/8.1
[51] Int. Cl.................................................F21v 7/00
[58] Field of Search.......240/41.6, 44, 44.1, 44.2, 57, 240/8.1

[56] References Cited

UNITED STATES PATENTS

| | | | |
|---|---|---|---|
| 3,546,445 | 12/1970 | Marchant | 240/41.6 |
| 3,594,569 | 7/1971 | Cranmore | 240/41.6 X |
| 2,910,575 | 10/1959 | Meschwitzer et al. | 240/44 X |
| 3,139,251 | 6/1964 | Walsh | 240/41.6 X |
| 3,493,740 | 2/1970 | Onksen | 240/44 |
| 2,920,188 | 1/1960 | Clayton et al. | 240/44 X |
| 2,868,961 | 1/1959 | Worden | 240/44 X |
| 2,911,522 | 11/1959 | Mears | 240/57 X |
| 2,647,204 | 7/1953 | McDowell | 240/44 X |
| 2,826,682 | 3/1958 | Falge | 240/44 X |
| 2,138,079 | 11/1938 | Taylor et al. | 240/41.6 X |

FOREIGN PATENTS OR APPLICATIONS 1,061,637  7/1959  Germany.........................240/44

*Primary Examiner*—Samuel S. Matthews
*Assistant Examiner*—Alan Mathews
*Attorney*—Holman & Stern

[57] ABSTRACT

A headlamp assembly for a road vehicle includes a mounting panel which is arranged to be secured to the body of the vehicle. A lamp unit is secured to the mounting panel by first and second screws and the arrangement is such that rotation of the screws serves to adjust the position of the lamp unit relative to the panel. The first and second screws are positioned on a diameter of the lamp unit on opposite sides of the lamp unit, the diameter being arranged at approximately 45° to the vertical in use. A support member interconnects the lamp unit and the panel and is spaced by approximately 90° around the peripheral of the lamp unit from the first and second screws. A spring acts between the corner of the lamp unit opposite the support member and the panel, to urge the lamp unit towards the panel.

6 Claims, 8 Drawing Figures

INVENTOR

Peter Frederick Bright & Michael John Germany

ATTORNEYS

INVENTOR
Peter Frederick Bright & Michael John Germany.

ATTORNEYS

HEADLAMP ASSEMBLIES

This invention relates to headlamp assemblies for road vehicles.

A headlamp assembly according to the invention includes a mounting panel arranged to be secured to a body part of the road vehicle, a lamp unit, first and second screws interconnecting the lamp unit and the panel in such a manner that rotation of the screws serves to move the lamp unit relative to the panel, the first and second screws being positioned on opposite sides of the lamp unit and being arranged on a diameter of the lamp unit which is inclined at approximately 45° to the vertical in use, a support member interconnecting the lamp and the panel and spaced by approximately 90° around the periphery of the lamp unit from the first and second screws and resilient means acting between the periphery of the lamp unit, at a point diametrically opposite said support member, and the panel to urge the lamp unit towards the panel.

Preferably the support member is in the form of a moulded synthetic resin member which resiliently grips the lamp unit at one end and the panel at its other end.

More preferably the assembly further includes a second lamp unit positioned along-side the first mentioned lamp unit and third and fourth screws, a second support member, and second resilient means, mounting the second lamp unit on the panel.

Figure 2:
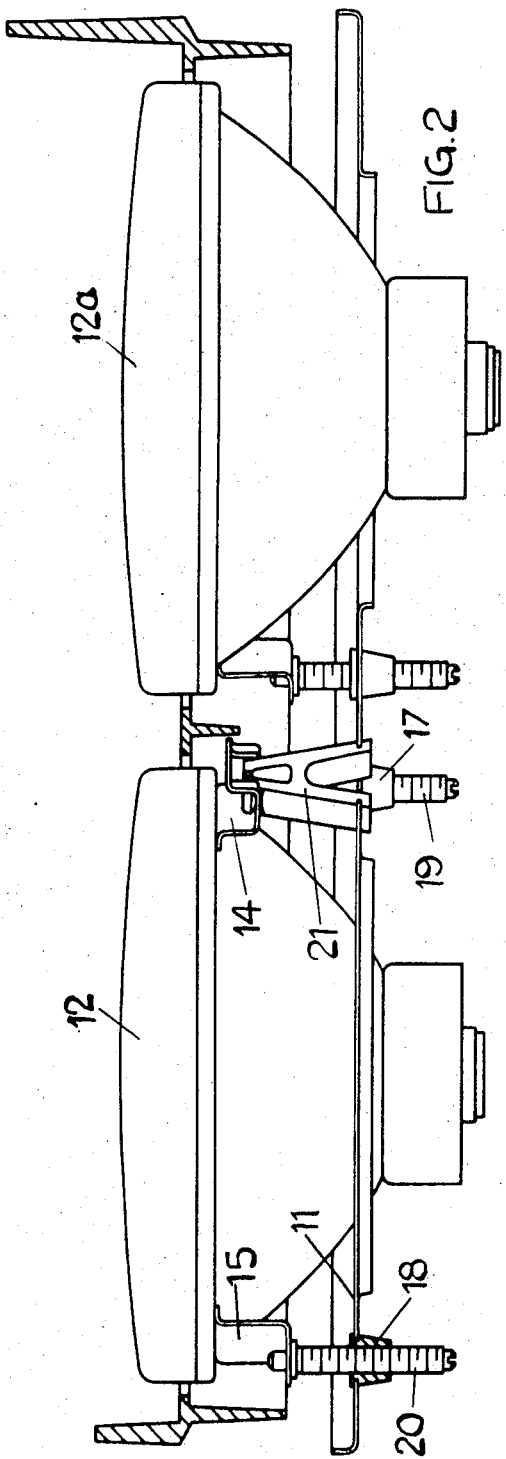
Figure 3:
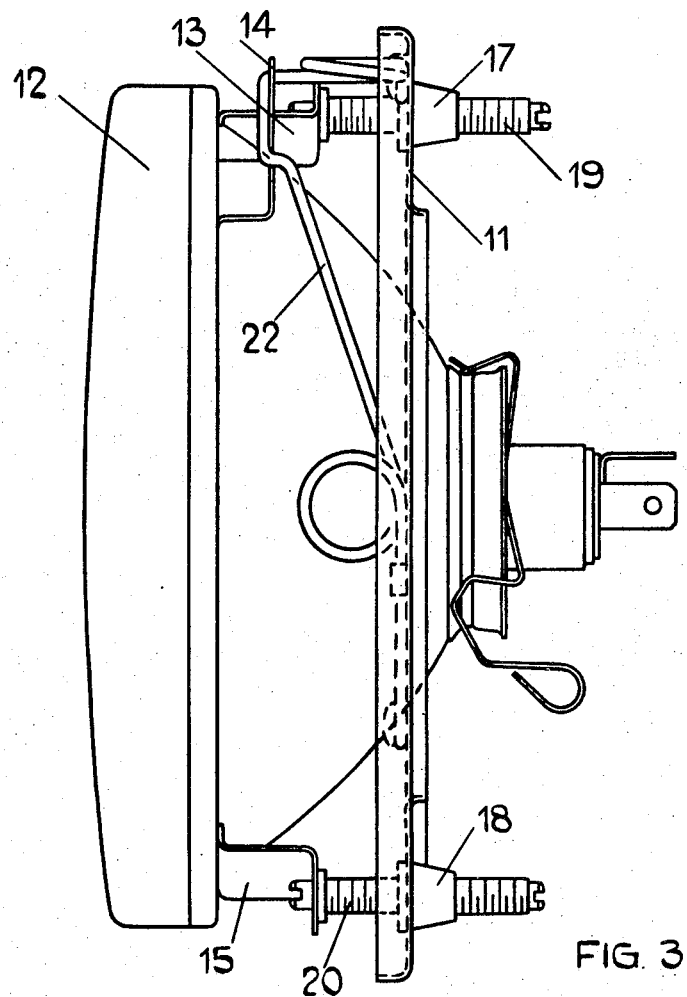
Figure 4:
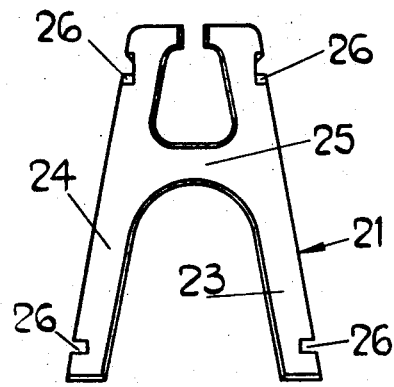
Figure 5:
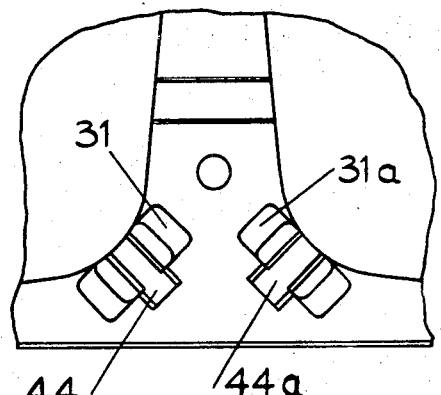
Figure 6:
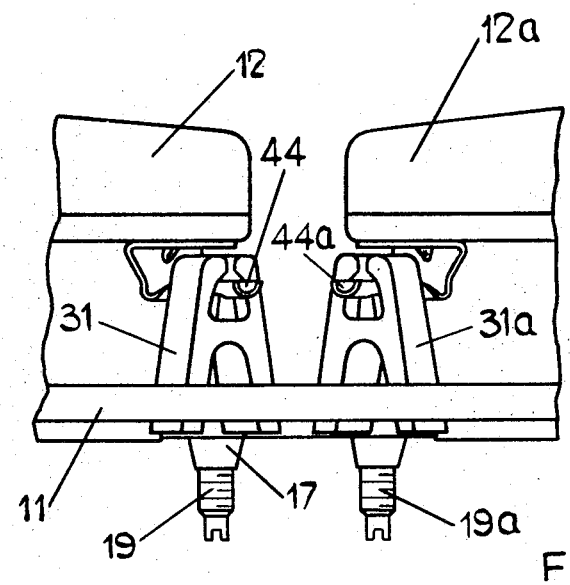
Figure 7:
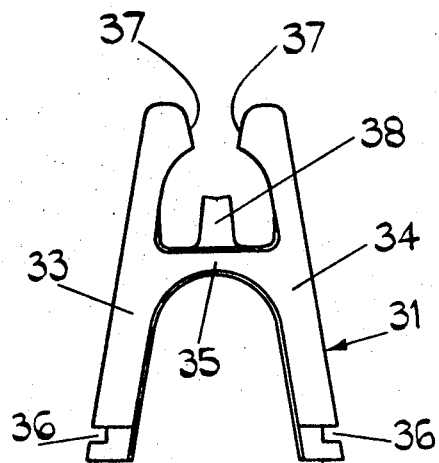
Figure 8:
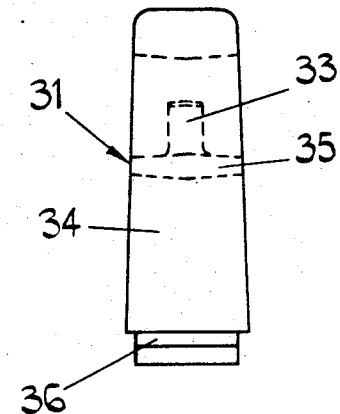

One example of the invention is illustrated in the accompanying drawings wherein, FIG. 1 is a fragmentary front elevational view of a lamp assembly, FIG. 2 is a view in the direction of arrow A in FIG. 1, FIG. 3 is a view in the direction of arrow B in FIG. 1, FIG. 4 is a plan view of a support member shown in FIG. 1, FIG. 5 is a fragmentary view similar to FIG. 1 of a modification, FIG. 6 is a view similar to FIG. 2 of the modification shown in FIG. 5, FIG. 7 is a plan view of the support member shown in FIG. 5 and FIG. 8 is a view in the direction of arrow C in FIG. 7.

Referring first to FIG. 1 to 4 of the drawings, the lamp assembly includes a metal mounting panel 11 which is adapted to be secured to the front bulkhead of the body of a road vehicle adjacent one side of the vehicle. The mounting panel 11 carries the headlamp or headlamps associated with one side of the vehicle, and a similar mounting panel carries the headlamp or headlamps associated with the opposite side of the vehicle.

The mounting panel 11 carries a lamp unit 12 having a generally square lens. The periphery of the lamp unit includes a metal mounting ring and extending from the four corners of the ring are first second third and fourth metal flanges 13, 14, 15 and 16 respectively. The lamp unit 12 is positioned in an aperture in the panel 11, and the flanges 13, 15 extend over respective moulded synthetic resin nuts 17, 18 secured to the panel 11. A pair of screws 19, 20 are rotatably secured to the flanges 13, 15 respectively, and are in screw threaded engagement with the nuts 17, 18. A support member 21 interconnects the flange 14 and the panel 11, and an L-shaped wire spring 22 having the free ends of its limbs secured to the panel 11 is engaged with the flange 16.

The apex of the spring 22 engages the flange 16, and the spring 22 is stressed so that the spring 22 urges the flange 16 towards the panel 11. Thus the lamp unit 12 is supported in spaced relation to the panel 11 by the screws 19, 20 and the support member 21, and is urged towards the panel 11 by the spring 22. There is a predetermined degree of compliance in the connection of the screws 19 20 and the support member 21 with their respective flanges, and so by rotating the screw 19, 20 relative to their respective flanges 13, 15 the inclination of the lamp unit with respect to the panel 11 can be altered both in a horizontal direction and a vertical direction. For example, when the panel is mounted vertically on a road vehicle rotation of the screw 20 relative to the flange 15 will cause the lamp unit 12 to be moved relative to the panel about an axis passing through the screw 19 and the support member 21 so as to adjust the direction of the beam of the lamp unit 12 in a horizontal plane, while rotation of the screw 19 relative to the flange 13 will cause the lamp unit 12 to be pivoted about an axis passing through the screw 20 and the support member 21 so as to adjust the direction of the beam of the lamp unit in a vertical plane.

The support member 21 is moulded in synthetic resin material and is generally in the form of a letter H. The limbs 23, 24 of the member 21 are interconnected by an integral bridge piece 25, and are inclined towards one another. The outer surfaces of the limbs 23, 24 adjacent their ends, are formed with transversely extending grooves 26, and the material from which the member 21 is formed is such that the limbs 23, 24 can be moved relative to one another by flexure of the bridge piece 25. During assembly of the lamp the widely spaced ends of the limbs 23, 24 are flexed towards one another to permit insertion of the ends of the limbs 23, 24 through an aperture in the panel 11. When the ends are inserted through the aperture in the panel the member is released and the limbs 23, 24 spring apart so as to engage the edges of the aperture in the panel, the edges of the aperture in the panel engaging in the slots 26 at one end of the limbs 23, 24. The flange 14 of the lamp unit 12 is also formed with an aperture, and in order to engage the flange 14 with the support member 21 the ends of the limbs 23, 24 remote from the panel 11 are flexed towards one another to permit insertion of the ends of the limbs through the aperture in the flange 14. Similarly, when the ends of the limbs have been inserted through the aperture in the flange 14 the limbs are released to allow the edges of the aperture in the flange 14 to engage in the groove 26 in the ends of the limbs of the member 21 remote from the panel. The arrangement is such that when the ends of the member 21 are assembled to the panel 11 and the flange 14 respectively then the member 21 remains stressed, to ensure that the ends of the limbs 23, 24 are engaged firmly with the flange 14 and the panel 21.

The panel 11 is formed with a second aperture alongside the aperture which receives the lamp unit 12, and a second lamp unit 12a is mounted on the panel 11 by way of screws 19a, 20a a support member 21a and spring 22a in the manner described with reference to the lamp unit 12. The arrangement of the screws 19a 20a, the support member 21a, and the spring 22a is such that the lamp 12a is arranged as a mirror image of the lamp unit 12, the screw 19a being adjacent the screw 19, and the support member 21a being adjacent the support member 21.

In use the panel 11 carrying the lamp units 12, 12a is mounted on one side of the front surface of the vehicle, and a similar panel carrying a further pair of lamp units is positioned on the opposite side of the front of the vehicle, one lamp unit on each of the panels constituting the main beam headlamp of the vehicle, while the other headlamp on each of the panels constitutes the dipped beam headlamp.

It will be appreciated that FIG. 2 is not a true view in the direction of arrow A in FIG. 1, the portion of FIG. 2 showing the lamp unit 12a being a view in the direction opposite to arrow A in FIG. 1.

In the modification shown in FIG. 5 to 8 the general arrangement is similar to that of FIGS. 1 to 4 with the exception that the support members 21, 21a are replaced by modified support members 31, 31a and the flange 14, 14a of the lamp units 12, 12a are replaced by modified flanges 44, 44a.

The modified support member 31 is moulded in synthetic resin material, and is generally in the form of a letter H. The limbs 33, 34 of the member 31 are interconnected by an integral bridge piece 35 and are inclined towards one another. The outer surfaces of the limbs 33, 34 adjacent one end thereof are formed with transversely extending grooves 36 and the material from which the member 31 is formed is such that the limbs 33, 34 can be moved relative to one another by flexure of the bridge piece 35. During assembly of the lamp the widely spaced ends of the limbs 33, 34 are flexed towards one another to permit insertion of the ends of the limbs 33, 34 through an aperture in the panel 11. When the ends are inserted through the aperture in the panel the member is released and the limbs 33, 34 spring apart so as to engage the edges of the aperture in said groove 36 of the limbs 33, 34.

The flange 44 of the lamp unit is of part circular cross section, and in order to engage the flange 44 with the support member 31, the inner surfaces of the ends of the limbs 33, 34 remote from the grooves 36 are inclined towards one another to define a pair of ramp surfaces 37. The convex surface of the flange 44 is inserted into the wider end of the gap defined between the surfaces 37, and the lamp unit 12 is moved towards the panel 11 so that the flange 44 acting on the surfaces 37 flexes the ends of the limbs 33, 34 away from one another to permit the flange 44 to pass the ramp surfaces 37. Extending upwardly towards the ramp surfaces 37 from the bridge piece 35 is an integral rib 38 the surface of the free end of which is concave. As the flange 44 clears the ends of the ramps 37 the convex surface of the flange 44 engages the concave surface of the rib 38, so that the flange 44 is supported by the rib 38. The free ends of the limbs 33, 34 flex back to their original positions, and the arrangement is such that the ends of the ramps 37 over-lie the flange 44, so that the flange 44 is trapped in position by the free ends of the limbs 33, 34 and the rib 38. The arrangement is of course sufficiently loose to permit adjustment of the position of the lamp unit 12 relative to the panel 11, while the degree of free movement between the flange 44 and the support member 31 is kept to a minimum.

As in the previous example the panel 11 is formed with a second aperture along side the aperture which receives the lamp unit 12, and a second lamp unit 12a is mounted on the panel 11 by way of screws 19a, 20a, a support member 31a, and spring 22a in the manner described with reference to the lamp unit 12. The arrangement of the screws 19a, 20a, the support member 31a and the spring 22a is such that the lamp unit 12a is arranged as a mirror image of the lamp unit 12, the screw 19a being adjacent the screw 19 and the support member 31a being adjacent the support member 31. In use the panel 11 carrying the lamp units 12, 12a is mounted on one side of the front surface of the vehicle, and another panel carrying a further pair of lamp units is positioned on the opposite side of the front of the vehicle, one lamp unit on each of the panels constituting the main beam headlamps of the vehicle, while the other headlamp on each of the panels constitutes the dipped beam headlamp. The other assembly utilizes components identical to those of the first mentioned assembly but arranged with the support members 31 at the lower corners of the panel and the two springs diametrically opposite their respective support members, that is to say adjacent the mid-point of the upper edge of the panel.

Having thus described our invention what we claim as new and desire to secure by Letters Patent is:

1. A headlamp assembly for a road vehicle including a mounting panel arranged to be secured to a body part of the road vehicle, a lamp unit, first and second screws interconnecting the lamp unit and panel in such a manner that rotation of the screws serves to move the lamp unit relative to the panel, the first and second screws supporting the lamp unit against movement towards the panel, and being positioned on opposite sides of the lamp unit, the screws being arranged on a diameter of the lamp unit which is inclined at approximately 45° to the vertical in use, an attaching element fixed and spaced approximately 90° around the periphery of said lamp unit from the first and second screws, a moulded synthetic resin support member interconnecting the lamp unit and the panel, said support member, by virtue of its own resilience, gripping at one end said attaching element, and at its other end the panel, and resilient means acting between the periphery of the lamp unit, at a point diametrically opposite said attaching element, and the panel to urge the lamp unit towards the panel.

2. An assembly as claimed in claim 1 further including a second lamp unit positioned alongside the first mentioned lamp unit and third and fourth screws, a second support member, attaching element, and second resilient means mounting the second lamp unit on the mounting panel.

3. An assembly as claimed in claim 2 wherein the arrangement of the second lamp unit and the associated components is such that the second lamp unit constitutes a mirror image of the first mentioned lamp unit.

4. An assembly as claimed in claim 1 wherein the attaching element is a flange which is engaged by the support member, the flange being formed with an aperture and a pair of edges of which are engaged by the support member.

5. An assembly as claimed in claim 1 wherein the attaching element is a flange which is engaged by the support member, the flange being of arcuate cross section and being engaged by a pair of limbs of the support member.

6. An assembly as claimed in claim 5 wherein the support member includes a rib having an arcuate surface engaged by the flange.

* * * * *